United States Patent
Lee et al.

(10) Patent No.: US 8,174,567 B2
(45) Date of Patent: May 8, 2012

(54) DIGITAL PHOTOGRAPHING APPARATUS, METHOD OF CONTROLLING THE APPARATUS, AND RECORDING MEDIUM HAVING RECORDED THEREON PROGRAM FOR EXECUTING THE METHOD

(75) Inventors: Seung-yun Lee, Changwon (KR); Tae-won Moon, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 605 days.

(21) Appl. No.: 12/317,452

(22) Filed: Dec. 22, 2008

(65) Prior Publication Data

US 2009/0237515 A1   Sep. 24, 2009

(30) Foreign Application Priority Data

Mar. 21, 2008   (KR) .................. 10-2008-0026297

(51) Int. Cl.
*H04N 9/04* (2006.01)
*G03B 17/00* (2006.01)

(52) U.S. Cl. ................ 348/78; 348/207.99; 348/333.04; 396/51

(58) Field of Classification Search .................... 348/78
See application file for complete search history.

(56) References Cited

U.S. PATENT DOCUMENTS

| | | | | |
|---|---|---|---|---|
| 7,664,389 | B2 * | 2/2010 | Kretz et al. | 396/263 |
| 2007/0195174 | A1 * | 8/2007 | Oren | 348/222.1 |
| 2007/0201724 | A1 * | 8/2007 | Steinberg et al. | 382/103 |
| 2007/0296848 | A1 * | 12/2007 | Terashima | 348/345 |
| 2008/0292299 | A1 * | 11/2008 | Kretz et al. | 396/263 |
| 2010/0194912 | A1 * | 8/2010 | Terashima | 348/222.1 |
| 2010/0239119 | A1 * | 9/2010 | Bazakos et al. | 382/103 |
| 2011/0033112 | A1 * | 2/2011 | Steinberg et al. | 382/190 |

FOREIGN PATENT DOCUMENTS

KR   1020040037605 A   5/2004

OTHER PUBLICATIONS

Byun, "Took a picture with eyes closed? it's ok . . . Development of Digital Cameras," Newsis, published on website: http://news.naver.com/main/read.nhn?mode=LSD&mid=sec&sid1=10... (Mar. 8, 2008).

Park, "Endless Development of Digital Cameras," published on website: http://www.hankyung.com/news/app/newsview.php?type=2&aid+200 (Feb. 28, 2008).

* cited by examiner

*Primary Examiner* — Lin Ye
*Assistant Examiner* — John H Morehead, III
(74) *Attorney, Agent, or Firm* — Drinker Biddle & Reath LLP (57) ABSTRACT

A digital photographing apparatus is provided that reduces the number of instances in which an image including a subject having closed eyes is obtained. A method of controlling the apparatus and a computer readable medium having recorded thereon a program for executing the method are also provided. The apparatus includes an image capture device that generates data from light incident thereon, and a blink determination unit that determines whether eyes are closed in an image from the generated data. The blink determination unit performs the determination as to whether eyes are closed only on an image from first still image data obtained in response to a signal received from a user. If the blink determination unit determines that eyes are closed in an image from still image data generated by the image capture device, still image data is obtained again from light incident on the image capture device.

14 Claims, 9 Drawing Sheets

DIGITAL PHOTOGRAPHING APPARATUS, METHOD OF CONTROLLING THE APPARATUS, AND RECORDING MEDIUM HAVING RECORDED THEREON PROGRAM FOR EXECUTING THE METHOD

CROSS-REFERENCE TO RELATED PATENT APPLICATION

This application claims the benefit of Korean Patent Application No. 10-2008-0026297, filed on Mar. 21, 2008 in the Korean Intellectual Property Office, the entire contents of which is incorporated herein by reference.

BACKGROUND OF THE INVENTION

1. Field of the Invention

The present invention relates to a digital photographing apparatus, a method of controlling the apparatus, and a computer readable recording medium having recorded thereon a program for executing the method. More particularly, the present invention relates to a digital photographing apparatus which is capable of reducing the number of instances in which a still image having a subject with closed eyes is obtained, a method of controlling the apparatus, and a computer readable recording medium having recorded thereon a program for executing the method.

2. Description of the Related Art

A digital photographing apparatus generally stores still image data that is obtained by taking photographs in a shooting mode in a storage medium. The apparatus displays an image from the stored still image data on a display unit in a playback mode. A captured still image can also be displayed on the display unit in the shooting mode.

In most instances, when a user captures a still image of a subject having a face with such a digital photographing apparatus, the user wants the subject's eyes not to be closed in the image. Nevertheless, it sometimes occurs that the subject's eyes are in fact closed in the image. In this case, in order to obtain an image in which the subject's eyes are not closed, the user must capture the still image once again, for example by taking another photograph. In this case, inconvenience is caused to the user since the user must individually check whether a subject's eyes are closed in a captured still image. Also, if the checking result reveals that eyes are closed and thus the still image must be obtained again, it would be difficult to obtain the still image again in the manner that the user originally desired since a considerable amount of time has likely passed from a point of time when the original photographing operation was performed.

SUMMARY OF THE INVENTION

The present invention provides a digital photographing apparatus capable of reducing the number of instances where a still image having a subject with closed eyes is obtained, a method of controlling the apparatus, and a computer readable recording medium having recorded thereon a program for executing the method.

According to an embodiment of the present invention, a digital photographing apparatus is provided. The digital photographing apparatus includes an image capture device generating data from light incident thereon; and a blink determination unit determining whether eyes are closed in an image from the generated data, wherein the blink determination unit performs the determination as to whether eyes are closed only on an image from first still image data obtained in response to a signal received from a user, and if the blink determination unit determines that eyes are closed in an image from still image data generated by the image capture device, still image data is obtained again from light incident on the image capture device.

The digital photographing apparatus may further include a face detection unit detecting a face from the image from the generated data, and the blink determination unit may operate only when a face is detected by the face detection unit.

According to an embodiment of the present invention, there is provided a digital photographing apparatus comprising an image capture device generating data from light incident thereon; and a blink determination unit determining whether eyes are closed in an image from data generated by the image capture device, wherein when, until or before still image data is obtained, the blink determination unit determines whether the eyes of a face included in the image from the generated data are closed, when still image data is to be obtained, if the blink determination unit determines that the eyes of a face included in an image from data obtained when or right before the still image data is obtained are closed, still image data is obtained a plurality of numbers of times, and when still image data is to be obtained, if the blink determination unit determines that the eyes of a face included in an image from data obtained when or right before the still image data is obtained are not closed, still image data is obtained once.

When still image data is obtained once, the blink determination unit may determine whether the eyes of a face included in an image from the obtained still image data are closed, and when the blink determination unit determines that the eyes are closed, a user may be informed of this fact.

When still image data is obtained once, the blink determination unit may determine whether the eyes of a face included in an image from the obtained still image data are closed, and when the blink determination unit determines that the eyes are closed, still image data may be obtained again from light incident on the image capture device.

The digital photographing apparatus may further include a storage medium storing obtained still image data; and an openness degree checking unit checking the degree of openness of eyes in the image from the data generated by the image capture device, wherein when still image data is obtained a plurality of numbers of times, still image data corresponding to an image in which the degree of openness of eyes is determined to be greatest from among images generated from the pieces of the still image data by the openness degree checking unit is stored in the storage medium.

The digital photographing apparatus may include a face detection unit detecting a face from the image from the data generated by the image capture device, wherein the blink determination unit operates only when a face is detected by the face detection unit.

According to another embodiment of the present invention, a method of controlling a digital photographing apparatus is provided. The method includes (a) obtaining still image data from light incident on an image capture device in response to a signal received from a user; (b) determining whether the eyes of a face included in an image from the obtained still image data are closed; (c) when it is determined in (b) that the eyes are closed, obtaining still image data again from light incident on the image capture device and storing the still image data in a storage medium; and (d) when it is determined in (b) that the eyes are not closed, storing the obtained still image data in the storage medium.

According to another embodiment of the present invention, a method of controlling a digital photographing apparatus is provided. In the method, data is obtained from light incident on an image capture device and whether the eyes of a face included in an image from the obtained data are closed, when, until or before still image data is obtained, the method comprising (a) when the still image data is obtained, determining whether the eyes of a face included in an image from data obtained when or right before the still image data is obtained are closed; (b) if it is determined in (a) that the eyes are closed, obtaining still image data a plurality of numbers of times; and (c) if it is determined in (a) that the eyes are not closed, obtaining still image data only once.

(c) may include (c1) if it is determined in (a) that the eyes are not closed, obtaining still image data only once; (c2) determining whether the eyes of a face included in an image from the obtained still image data are closed; and (c3) if it is determined in (c2) that the eyes are closed, informing a user of this fact.

(c) may include (c1) if it is determined in (a) that the eyes are not closed, obtaining still image data only once; (c2) determining whether the eyes of a face included in an image from the obtained still image data are closed; and (c3) if it is determined in (c2) that the eyes are closed, obtaining still image data again from light incident on the image capture device.

(b) may include (b1) if it is determined in (a) that the eyes are not closed, obtaining still image data a plurality of numbers of times; and (b2) storing still image data corresponding to an image in which the degree of openness of eyes of which is determined to be greatest from among images from the plurality of pieces of the still image data, in the storage medium.

According to another embodiment of the present invention, a computer readable medium is provided. The computer readable medium has a computer program, for executing the method described previously, recorded on the computer readable medium.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Exemplary embodiments of the present invention will now be described in detail with reference to the attached drawings.

Figure 1:
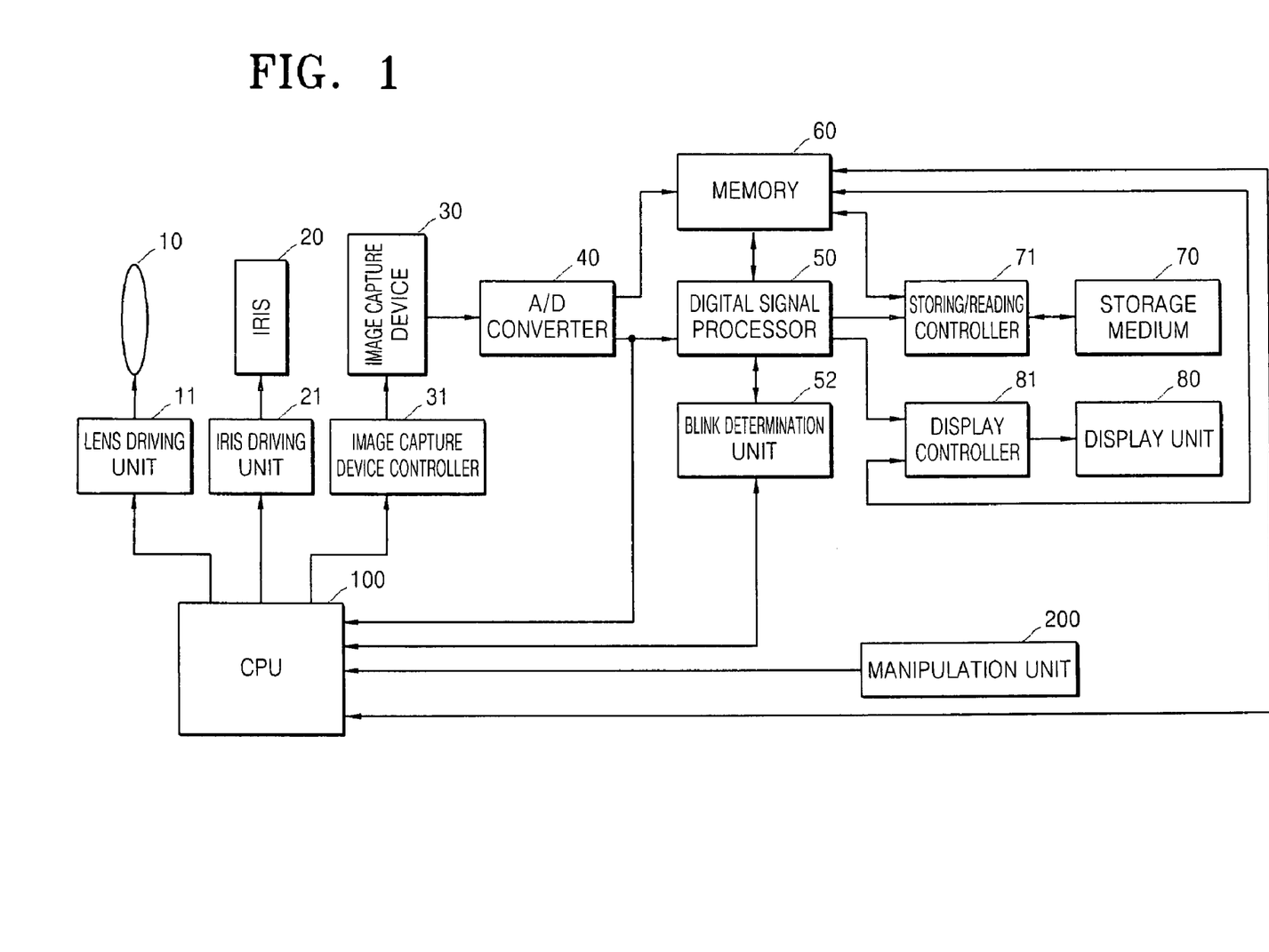
FIG. 1 is a block diagram schematically illustrating an example of a digital photographing apparatus according to an embodiment of the present invention.

FIG. 1 is a block diagram schematically illustrating an example of a digital photographing apparatus according to a first embodiment of the present invention. All operations of the digital photographing apparatus are controlled by a central processing unit (CPU) 100. The digital photographing apparatus includes a manipulation unit 200 having a key generating an electrical signal in response to a user's instruction. An electrical signal generated by the manipulation unit 200 is delivered to the CPU 100 so that the CPU 100 can control the digital photographing apparatus in response to the electrical signal.

In a shooting mode, if an electrical signal generated in response to a user's instructions is input to the CPU 100, the CPU 100 analyzes the electrical signal and controls a lens driving unit 11, an iris driving unit 21, and an image capture device controller 31, thus controlling the location of a lens 10, the degree of openness of an iris 20, and the sensitivity of an image capture device 30. The image capture device 30 generates data regarding a preview image, which is a still image or a real-time moving image, from received light. An analog/digital (A/D) converter 40 converts analog data received from the image capture device 30 into digital data. The A/D converter 40 may be omitted depending on the characteristics of the image capture device 30.

Data output from the image capture device 30 is provided to a digital signal processor 50 via a memory 60 or without the memory 60. If necessary, the data output from the image capture device 30 may also be provided to the CPU 100. Here, the memory 60 may include a read-only memory (ROM) or a random access memory (RAM). The digital signal processor 50 can perform digital signal processing, such as gamma correction or white balance correction, if needed. As illustrated in the example of FIG. 1, data output from the digital signal processor 50 may be supplied to a blink determination unit 52. However, unlike as illustrated in FIG. 1, the blink determination unit 52 may be a part of the digital signal processor 50 or of another component. Also, unlike as illustrated in the example of FIG. 1, data may be supplied to the blink determination unit 52 from the A/D converter 40 either directly without the digital signal processor 50 or via the memory 60. The blink determination unit 52 determines whether or not eyes are closed in an image from data generated by the image capture device 30.

Data output from the digital signal processor 50 is delivered to a display controller 81 directly or via the memory 60. The display controller 81 controls a display unit 80 in order to display a preview image which is a still image or a real-time moving image on the display unit 80. The data output from the digital signal processor 50 is input to a storing/reading controller 71 via the memory 60 or directly. The storing/reading controller 71 stores the data in a storage medium 70, in response to a signal received from the user or automatically. Alternatively, the storing/reading controller 71 may interpret image data stored in the storage medium 70, and provide the result of the interpretation to the display controller 81 via the memory 60 or via another path so that a moving image or a still image can be displayed on the display unit 80. The storage medium 70 can be easily attached to and detached from the digital photographing apparatus or it can be fixedly built into the digital photographing apparatus.

The digital photographing apparatus according to the first embodiment can reduce the number of cases where a still image with closed eyes is obtained more significantly than a conventional digital photographing apparatus. In other words, when still image data is obtained from light incident upon the image capture device 30, the blink determination unit 52 determines whether eyes are closed in an image from the still image data. If the blink determination unit 52 determines that the eyes are not closed in the image from the still image data, the digital photographing apparatus according to the first embodiment either displays the image from the still image data on the display unit 80 or stores the still image data in the storage medium 70. If the blink determination unit 52 determines that the eyes are closed in the image from the still image data, the digital photographing apparatus obtains the still image data again from light incident upon the image capture device 30 and then stores it in the storage medium 70.

Although not shown in the example of FIG. 1, because the blink determination unit 52 determines whether eyes are closed in an image from image data and eyes are located in a face, the digital photographing apparatus may further include a face detection unit that detects a face in an image from still image data and the blink determination unit 52 may operate only when the face detection unit detects a face from an image. Alternatively, the face detection unit may be included in the digital signal processor 50 or another component, or be separated from the other components.

If the digital photographing apparatus includes the face detection unit, the face detection unit may determine whether a face is included in a still image and detect the location of the face if the face is included, based on data for face detection that is stored in the memory 60. There are various ways of detecting a face from an image. For example, data regarding main colors of a face has been stored, and face detection may be performed by checking whether image data contains the data. Also, in an example, data regarding shapes of pupils or eyes of a face has been stored, and face detection may be performed by checking whether image data contains the data. Also, in an example, data regarding T-shapes formed, for example, by eyebrows (or eyes) and a nose of a face has been stored, and face detection may be performed by checking whether image data contains the data.

The blink determination unit 52 can determine whether eyes are closed in various ways. For example, the blink determination unit 52 may check a ratio of width to height of each of eyes, and determine that the eyes are closed when the ratio of width to height is less than a predetermined size.

The blink determination unit 52 determines whether eyes are closed only on an image from a first still image data obtained in response to a signal received from a user, and not on all still image data obtained by the image capture device 30. That is, the blink determination unit 52 determines whether eyes are closed in an image from the first obtained still image data, and stores the still image data in the storage medium 70 if the eyes are not closed. Here, the storing of the still image data in the storage medium 70 may be understood that the storing is performed according to a user's selection or automatically (which is also applied to the following embodiments of the present invention or a modified example thereof).

If the blink determination unit 52 determines that eyes are closed in the image from the first obtained still image, still image data is secondly obtained from light incident upon the image capture device 30 but an image from the secondly obtained still image data is directly stored in the storage medium 70 without performing the determination on the image. This is because in general, eyes are not likely to be closed in an image from still image data obtained again right after an image with closed eyes was captured, in consideration of a time difference between when the first still image data was obtained and the secondly still image data is obtained. Of course, in another embodiment of the present invention, whether eyes are closed may be determined on an image from still image data being secondly obtained by the blink determination unit 52.

Figure 2:
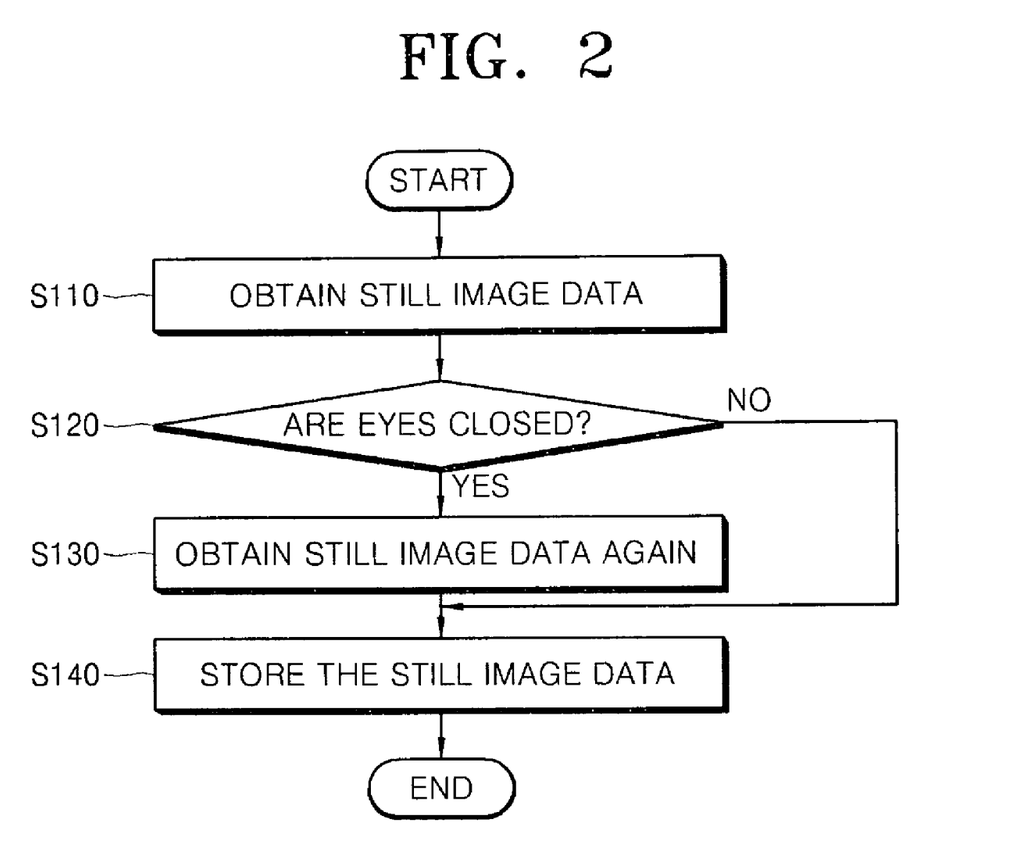
FIG. 2 is a flowchart illustrating an example of a method of controlling a digital photographing apparatus according to an embodiment of the present invention.

FIG. 2 is a flowchart schematically illustrating an example of a method of controlling a digital photographing apparatus according to the first embodiment of the present invention. More particularly, FIG. 2 is a flowchart schematically illustrating an example of a method of controlling the digital photographing apparatus illustrated in the example of FIG. 1 according to a second embodiment of the present invention.

In the flowchart of FIG. 2, "start" means start of various processes, such as a shooting mode or a blink-prevention shooting mode. As illustrated in the example of FIG. 2, still image data is first obtained from light incident upon an image capture device in response to a signal received from a user (operation S110). Next, it is determined whether eyes of a subject's face included in an image from the obtained still image data are closed (operation S120). If it is determined in operation S120 that the subject's eyes are closed, still image data is obtained again from light incident upon the image capture device (operation S130) and the secondly obtained still image data is stored in a storage medium (operation S140). If it is determined in operation S120 that the subject's eyes are not closed, the firstly obtained still image data is stored in the storage medium without performing operation S130 (operation S140). According to the method according to the second embodiment, it is possible to reduce the number of instances where a still image having a subject with closed eyes is obtained more significantly than when using a conventional digital photographing apparatus.

For convenience of explanation, a digital photographing apparatus according to a third embodiment of the present invention will now be described with reference to FIG. 1.

The digital photographing apparatus according to the third embodiment of the present invention includes an image capture device 30, that generates data from light incident thereon, and a blink determination unit 52, that determines whether eyes are closed in an image from the data. The blink determination unit 52 determines whether the eyes of a subject's face included in an image from light incident on the image capture device 30 are closed when, until or before still image data is obtained. If the blink determination unit 52 determines that the eyes of a subject's face included in an image from data obtained when or right before the still image data is obtained are closed, then the digital photographing apparatus according to the third embodiment obtains the still image data a plurality of number of times. Adversely, if the blink determination unit 52 determines that the eyes of a subject's face included in an image from data obtained when or right before the still image data is obtained are not closed, the digital photographing apparatus according to the third embodiment obtains the still image data once.

The digital photographing apparatus according to the third embodiment may operate in two modes. In a first mode, until or before the image capture device 30 obtains still image data, i.e., until or before a point of time photographing is performed, the blink determination unit 52 continues to analyze data from light incident on the image capture device 30 and determines whether eyes are closed in an image, based on the analyzed data.

While the blink determination unit 52 continues to determine whether eyes are closed in an image from data generated from light incident on the image capture device 30, if the blink determination unit 52 determines that the eyes are closed at the moment or right before photographing is performed, the digital photographing apparatus according to the third embodiment obtains the still image data a plurality of number of times. Here, the plurality of pieces of the still image data are obtained from light that is incident on the image capture device 30 at different times, and thus, images from the pieces of the still image data are different from one another. Thus, because it is highly probable that eyes will not be closed in at least one of the pieces of the still images, a user can obtain a still image in which eyes are not closed. While the blink determination unit 52 continues to determine whether eyes are closed in an image from data generated from light incident on the image capture device 30, if the blink determination unit 52 determines that the eyes are not closed at the moment or right before photographing is performed, the digital photographing apparatus according to the third embodiment obtains the still image data once. In this case, it is highly probable that still image data will be obtained regarding a still image in which a subject's eyes will not be closed.

Unlike the first mode, in a second mode of the digital photographing apparatus according to the third embodiment, the blink determination unit 52 does not continue to determine whether a subject's eyes are closed in an image from data generated from light incident on the image capture device 30 but determines whether a subject's eyes are closed in the image at the moment or right before photographing is performed. If the determination reveals that eyes are closed, the digital photographing apparatus according to the third embodiment obtains still image data a plurality of numbers of times. In this case, a plurality of pieces of still image data are obtained from light that is incident on the image capture device 30 at different times, images from the pieces of the still image data are different from one another. Thus, it is highly probable that a subject's eyes will not be closed in at least one of the still images, and thus, a user can obtain a still image in which eyes are not closed. If the blink determination unit 52 determines whether eyes are closed in an image at the moment or right before photographing is performed, the digital photographing apparatus according to the third embodiment obtains still image data only once since it is highly probable that still image data regarding a still image data in which eyes are not closed will be obtained in this case. As described above, various modes can be applied to the digital photographing apparatus according to the third embodiment.

If the digital photographing apparatus according to the third embodiment obtains still image data only once, it is highly probable that eyes are not closed in an image from the still image data. However, if an interval of time is present between when the blink determination unit 52 operates and when the still image data is obtained, a subject's eyes may be closed in an image from the still image data. Thus, the blink determination unit 52 may determine whether the eyes of a subject's face included in the image from the still image data are closed. If the blink determination unit 52 determines that the eyes are closed, it informs a user that the eyes of the subject included in the image from the still image data are closed, so that the user can deal with this problem. Various methods can be used in order to inform the user of this problem. For example, the user may be informed of this problem by displaying it on the display unit 80 of the digital photographing apparatus or by generating a warning sound.

Alternatively, if still image data is obtained only once and the blink determination unit 52 determines that the eyes of a subject's face included in an image from the still image data are closed, the digital photographing apparatus according to the third embodiment may obtain another still image data from light incident on the image capture device 30 without informing the user of this problem.

Since the blink determination unit 52 determines whether a subject's eyes are closed in an image from data and eyes are located in a subject's face, the digital photographing apparatus according to the third embodiment may further include a face detection unit (not shown) that detects a face from an image, unlike as illustrated in FIG. 1, and the blink determination unit 52 may operate only when the face detection unit detects a face. The face detection unit may be included in the digital signal processor 50 or another component, or be an independent component located separately from the other components, for example.

Figure 3:
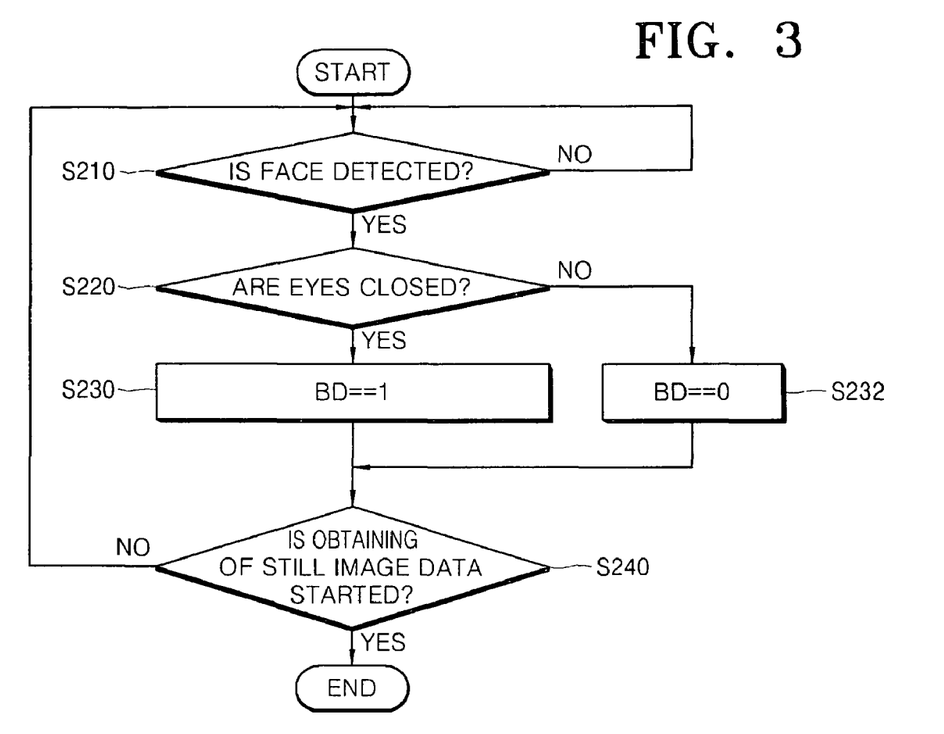
FIG. 3 is a flowchart illustrating an example of a method of controlling a digital photographing apparatus according to another embodiment of the present invention.

FIGS. 4A through 4D are flowcharts schematically illustrating examples of methods of controlling a digital photographing apparatus according to first through third embodiments of the present invention. FIG. 3 is a flowchart schematically illustrating an example of a method of controlling a digital photographing apparatus that provides an environment that can be applied to the methods of FIGS. 4A through 4D, according to an embodiment of the present invention.

FIG. 3 illustrates an example of a process of determining whether the eyes of a subject's face included in an image from light incident on an image capture device are closed when, until, or before still image data is obtained. Referring to FIG. 3, "start" means the start of displaying a preview image which, for example, may be a real-time moving image on a display unit. However, in some cases, it may, for example, mean the start of a shooting mode or a blink detection mode without displaying a preview image on the display unit.

Referring to the example of FIG. 3, a determination is first made of whether a subject's face is detected as being included in an image from data obtained by the image capture device (operation S210). If it is determined in operation S210 that a subject's face is not included in the image, operation S210 is performed again after a predetermined interval of time since a user may change an object that is to be photographed using a digital photographing apparatus. If it is determined in operation S210 that a subject's face is included in the image, a determination is made of whether the eyes of the subject's face are closed (operation S220). If the eyes are closed, variable BD is set to '1' (operation S230), and if the eyes are not closed, variable BD is set to '0' (operation S232). Then, a determination is made of whether obtaining of still image data starts (operation S240). If obtaining of still image data does not start, operation S210 is performed again after a predetermined interval of time since the user may change an object that is to be photographed using the digital photographing apparatus. If obtaining of still image data starts, the process ends. Here, "end" means the start of obtaining still image data.

Figure 4A:
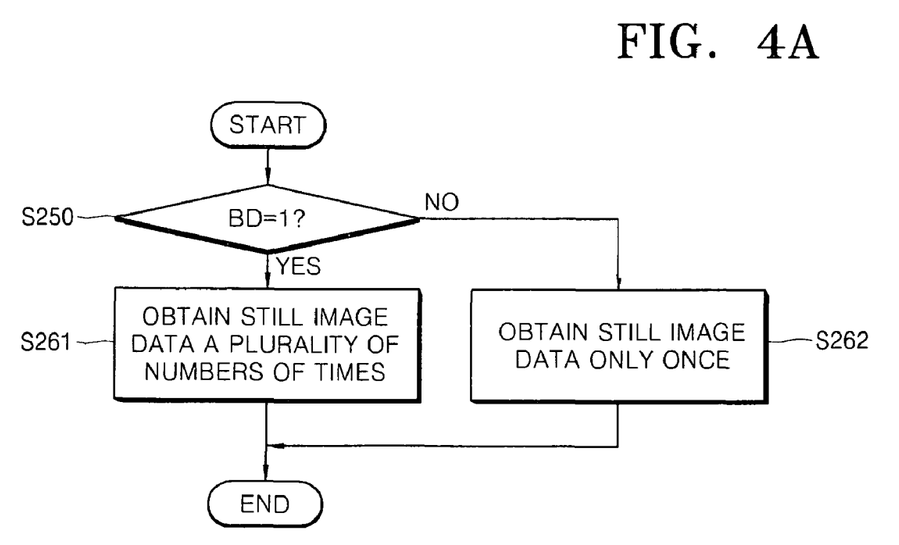
FIGS. 4A through 4D are flowcharts schematically illustrating examples of methods of controlling a digital photographing apparatus related to the flowchart of FIG. 3, according to embodiments of the present invention.

Under such an environment, in a method of controlling a digital photographing apparatus illustrated in the example of FIG. 4A according to a fourth embodiment of the present invention, while still image data is obtained, a determination is made of whether the eyes of a subject's face included in an image from data obtained when or right before the still image data is obtained (operation S250) are closed. Assuming that data, e.g., whether variable BD is set to '1', which indicates the eyes are closed or if variable BD is set to '0' which indicates the eyes are not closed, as illustrated in FIG. 3, whether the eyes of the face in the image from the data obtained when or right before the still image data is obtained are closed can be determined by checking the input data.

If it is determined in operation S250 that the eyes are closed (BD is '1'), still image data is obtained a plurality of numbers of times (operation S261). If it is determined in operation S250 that the eyes are not closed (BD is '0'), still image data is obtained only once (operation S262). Accordingly, it is possible to minimize the number of cases where a still image with closed eyes is obtained.

Figure 4B:
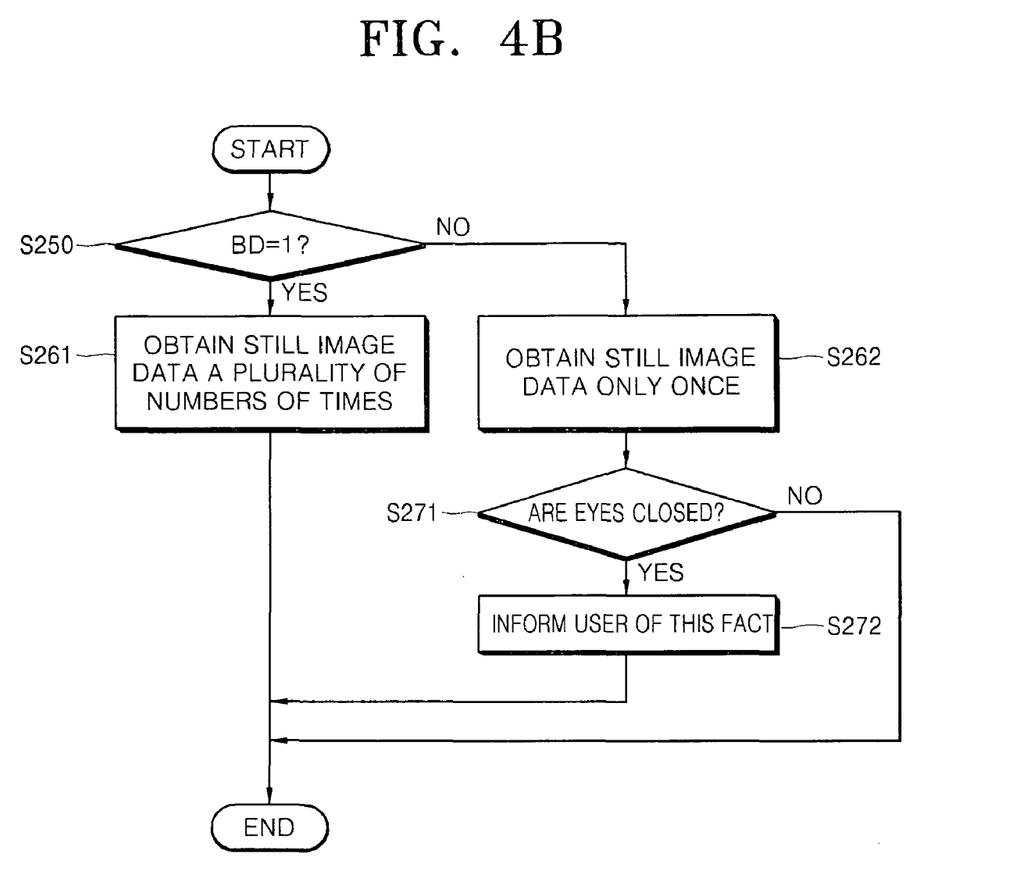

FIG. 4B is a flowchart schematically illustrating an example of a method of controlling a digital photographing apparatus according to a fifth embodiment of the present invention. As compared to the example of the method according to the fourth embodiment illustrated in FIG. 4A, the method of FIG. 4B further includes a plurality of operations to be performed after obtaining still image data only once in operation S262 when it is determined in operation S250 that eyes are not closed. Referring to FIG. 4B, according to the fifth embodiment, the digital photographing apparatus determines whether the eyes of a face included in an image from obtained still image data are closed (operation S271). If it is determined in operation S271 that the eyes are not closed, the method ends, for example, by storing the still image data in a storage medium. If it is determined in operation S271 that the eyes are closed, this fact is informed to a user so that the user can deal with this fact (operation S272). In this case, the user can be informed of this fact in various ways, for example, by generating a warning sound or by displaying this fact on a display unit.

Figure 4C:
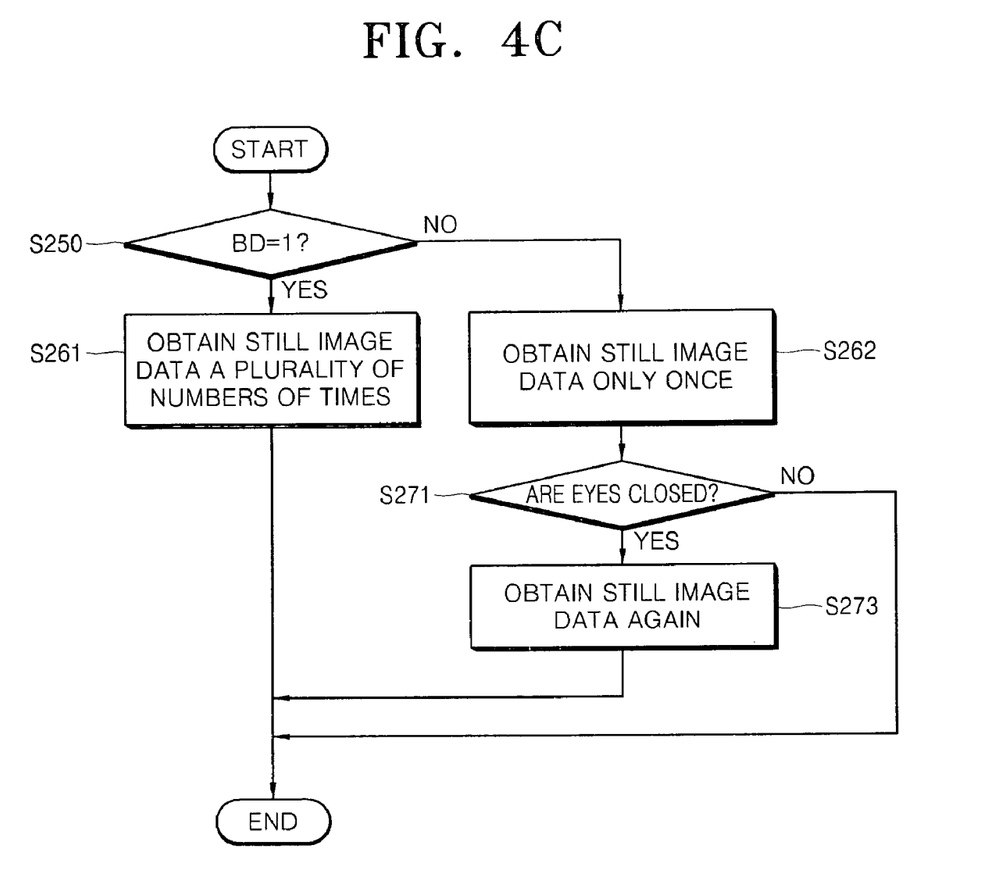

FIG. 4C is a flowchart schematically illustrating an example of a method of controlling a digital photographing apparatus according to a sixth embodiment of the present invention. The example of the method of FIG. 4C is different from the example of the method according to the fifth embodiment illustrated in FIG. 4B in terms of an operation to be performed when it is determined in operation S271 that eyes are closed. According to the sixth embodiment, when it is determined in operation S250 that eyes are not closed, still image data is obtained once (operation S262), and a determination is made of whether the eyes of a face included in an image from the still image data are closed (operation S271). If it is determined in operation S271 that eyes are not closed, the method ends, for example, by storing the still image data in a storage medium. If it is determined in operation S271 that eyes are closed, still image data is obtained again from light incident on an image capture device (operation S273). Accordingly, it is possible to greatly reduce the number of instances where a process ends while obtaining a still image including a subject having closed eyes.

Figure 4D:
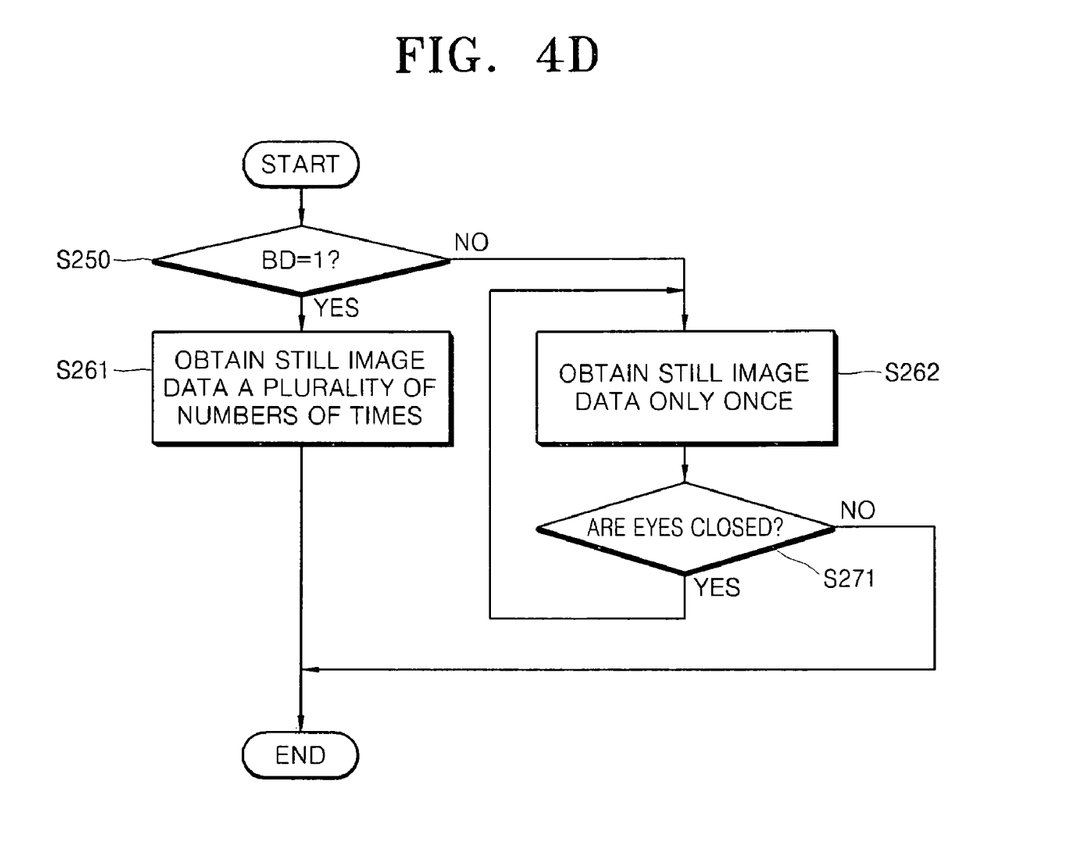

FIG. 4D is a flowchart schematically illustrating an example of a method of controlling a digital photographing apparatus according to a seventh embodiment of the present invention. The example of the method of FIG. 4D is different from the example of the method according to the sixth embodiment illustrated in FIG. 4C in terms of an operation to be performed when it is determined that a subject's eyes are closed in operation S271. According to the seventh embodiment, when it is determined in operation S250 that eyes are not closed, still image data is obtained once (operation S262), and a determination is made of whether the eyes of a subject's face included in an image from the obtained still image data are closed (operation S271). If it is determined in operation S271 that the eyes are not closed, the method ends, for example, by storing the still image data in a storage medium. If it is determined in operation S271 that the eyes are closed, still image data is obtained again from light incident on an image capture device (operation S262). In the case of the still image obtained again in operation S262, operation S271 is also performed in order to obtain a still image in which eyes of a subject are not closed.

Figure 5:
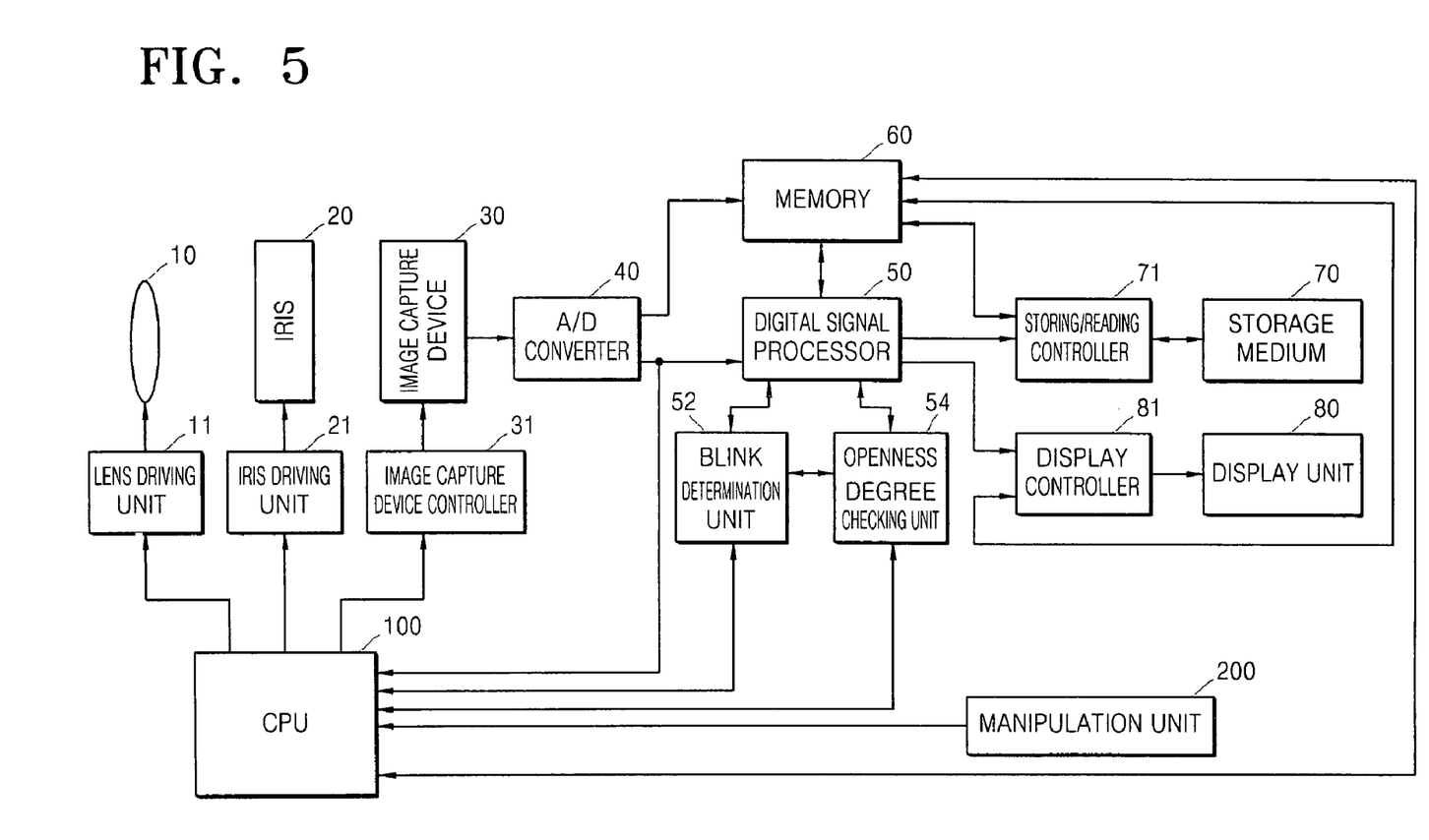
FIG. 5 is a block diagram schematically illustrating an example of a digital photographing apparatus according to another embodiment of the present invention.

FIG. 5 is a block diagram schematically illustrating an example of a digital photographing apparatus according to an eighth embodiment of the present invention. The digital photographing apparatus according to the eighth embodiment is differentiated from those according to the above embodiments described above with reference to FIG. 1, in that it further includes an openness degree checking unit 54, for example. The openness degree checking unit 54 checks the degree of openness of eyes in an image from data generated by an image capture device. The checking of the degree of openness of eyes may be understood that the greater the ratio of width to height of each of the eyes, the greater the degree of openness of the eyes.

When still image data is obtained a plurality of number of times as in the above embodiments described above with reference to FIG. 1, the openness degree checking unit 54 does not store all the obtained pieces of the still image data in a storage medium 70 but instead stores still image data corresponding to an image in which the degree of openness of the eyes is determined to be greatest from among a plurality of images generated from the pieces of the still image data by the openness degree checking unit 54, in the storage medium 70. Since the digital photographing apparatus according to the eighth embodiment is designed to photograph a still image in which a subject's eyes are not closed, it is possible to increase a user's convenience by allowing a still image in which the degree of openness of eyes is greatest to be automatically selected from among still images, in addition to obtaining a still image in which a subject's eyes are not closed. This is because a user generally stores one still image in which the degree of openness of eyes is highest from among similar still images being consecutively photographed.

Figure 6A:
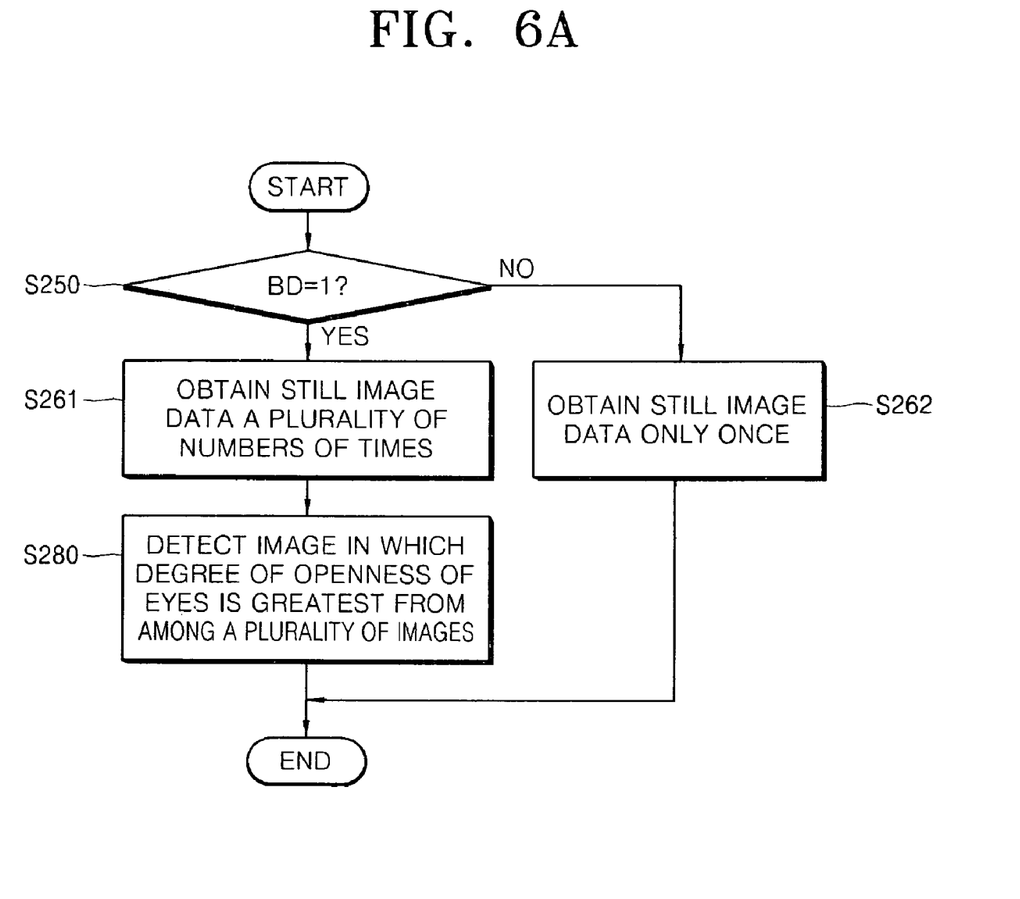
FIGS. 6A and 6B are flowcharts schematically illustrating examples of methods of controlling a digital photographing apparatus related to the flowchart of FIG. 3, according to embodiments of the present invention.

FIG. 6A is a flowchart schematically illustrating an example of a method of controlling a digital photographing apparatus according to a ninth embodiment of the present invention. Compared to the example of the method according to the fourth embodiment illustrated in FIG. 4A, the example of the method according to the ninth embodiment further includes detecting an image in which the degree of openness of eyes is greatest from among a plurality of images generated from a plurality of pieces of still image data (operation S280) after obtaining still image data a plurality of numbers of times (operation S261). Then, still image data corresponding to the detected image may be stored in a storage medium according to a user's selection. Accordingly, it is possible to increase a user's convenience by allowing a still image in which the degree of openness of a subject's eyes is greatest to be automatically selected from among a plurality of still images, in addition to obtaining a still image in which a subject's eyes are not closed.

Figure 6B:
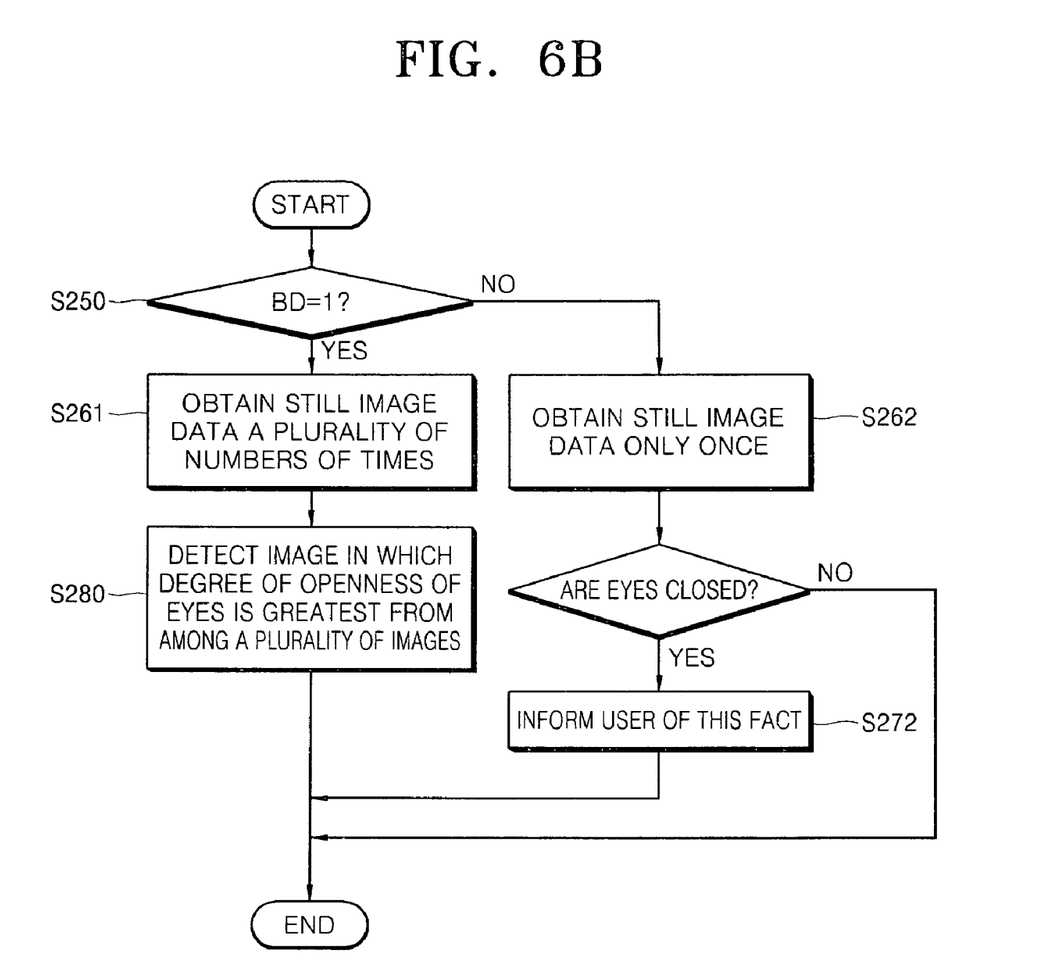

FIG. 6B is a flowchart schematically illustrating an example of a method of controlling a digital photographing apparatus according to a tenth embodiment of the present invention. Compared to the example of the method according to the fifth embodiment illustrated in FIG. 4B, the example of the method according to the tenth embodiment further includes detecting an image in which the degree of openness of a subject's eyes is greatest from among a plurality of images generated from a plurality of pieces of still image data (operation S280) after obtaining still image data a plurality of numbers of times (operation S261). Then, still image data corresponding to the detected image may be stored in a storage medium according to a user's selection. Accordingly, it is possible to increase a user's convenience by allowing a still image in which the degree of openness of a subject's eyes is greatest to be automatically selected from among a plurality of still images, in addition to obtaining a still image in which a subject's eyes are not closed.

Although not shown in the drawings, in modified examples of the methods according to the sixth and seventh embodiments described above with reference to the examples of FIGS. 4C and 4D, respectively, an image in which the degree of openness of eyes is greatest may further be detected from among images obtained from a plurality of pieces of still image data, after obtaining still image data a plurality of numbers of times (operation S261).

A program for executing a method of controlling a digital photographing apparatus according to the above embodiments and modified examples thereof in the digital photographing apparatus can be stored in a recording medium. Here, the recording medium may be the storage medium 70 or the memory 60 illustrated in FIG. 1, for example, or another type of a storage medium. The readable storage medium may be, for example, a magnetic storage medium (a read-only memory (ROM), a floppy disk, or a hard disc, and the like, for example), an optical storage medium (a compact disc (CD)-ROM or a digital versatile disc (DVD), and the like, for example).

As described above, in a digital photographing apparatus, a method of controlling the same, and a computer readable medium having recorded thereon a program for executing the method according to the above embodiments of the present invention, it is possible to greatly reduce the number of instances in which a still image having a subject with closed eyes is obtained.

While the present invention has been particularly shown and described with reference to exemplary embodiments thereof, it will be understood by those having ordinary skill in the art that various changes in form and details may be made therein without departing from the spirit and scope of the present invention as defined by the following claims.

What is claimed is:

1. A digital photographing apparatus comprising:
   an image capture device for generating data from light incident thereon; and
   a blink determination unit for determining whether eyes are closed in an image from data generated by the image capture device,
   wherein when, until or before still image data is obtained, the blink determination unit determines whether the eyes of a face included in the image from the generated data are closed,
   when still image data is to be obtained, if the blink determination unit determines that the eyes of a face included in an image from data obtained when or right before the still image data is obtained are closed, still image data is obtained a plurality of numbers of times, and
   when still image data is to be obtained, if the blink determination unit determines that the eyes of a face included in an image from data obtained when or right before the still image data is obtained are not closed, still image data is obtained once.

2. The digital photographing apparatus of claim 1, wherein when still image data is obtained once, the blink determination unit determines whether the eyes of a face included in an image from the obtained still image data are closed, and when the blink determination unit determines that the eyes are closed, a user is informed of this fact.

3. The digital photographing apparatus of claim 1, wherein when still image data is obtained once, the blink determination unit determines whether the eyes of a face included in an image from the obtained still image data are closed, and when the blink determination unit determines that the eyes are closed, still image data is obtained again from light incident on the image capture device.

4. The digital photographing apparatus of claim 1, further comprising:
   a storage medium for storing obtained still image data; and
   an openness degree checking unit for checking the degree of openness of eyes in the image from the data generated by the image capture device,
   wherein when still image data is obtained a plurality of numbers of times, still image data corresponding to an image in which the degree of openness of eyes is determined to be greatest from among images generated from the pieces of the still image data by the openness degree checking unit is stored in the storage medium.

5. The digital photographing apparatus of claim 1, further comprising a face detection unit for detecting a face from the image from the data generated by the image capture device,
   wherein the blink determination unit operates only when a face is detected by the face detection unit.

6. A method of controlling a digital photographing apparatus, in which data is obtained from light incident on an image capture device and whether the eyes of a face included in an image from the obtained data are closed, when, until or before still image data is obtained, the method comprising:
   (a) when the still image data is obtained, determining whether the eyes of a face included in an image from data obtained when or right before the still image data is obtained are closed;
   (b) if it is determined in (a) that the eyes are closed, obtaining still image data a plurality of numbers of times; and
   (c) if it is determined in (a) that the eyes are not closed, obtaining still image data only once.

7. The method of claim 6, wherein (c) comprises:
   (c1) if it is determined in (a) that the eyes are not closed, obtaining still image data only once;
   (c2) determining whether the eyes of a face included in an image from the obtained still image data are closed; and
   (c3) if it is determined in (c2) that the eyes are closed, informing a user of this fact.

8. The method of claim 6, wherein (c) comprises:
   (c1) if it is determined in (a) that the eyes are not closed, obtaining still image data only once;
   (c2) determining whether the eyes of a face included in an image from the obtained still image data are closed; and
   (c3) if it is determined in (c2) that the eyes are closed, obtaining still image data again from light incident on the image capture device.

9. The method of claim 6, wherein (b) comprises:
   (b1) if it is determined in (a) that the eyes are not closed, obtaining still image data a plurality of numbers of times; and
   (b2) storing still image data corresponding to an image in which the degree of openness of eyes of which is determined to be greatest from among images from the plurality of pieces of the still image data, in the storage medium.

10. A non-transitory computer-readable medium having recorded thereon a computer program that, when executed, causes a machine to carry out at least the method of claim 6.

11. A non-transitory computer-readable storage medium storing instructions that, when executed, cause a machine to at least:
   generate data from light incident on an image capture device; and
   when, until or before still image data is obtained, determine whether eyes of a face included in an image formed from the generated data are closed;
   when still image data is to be obtained, if the eyes of the face included in an image formed from data obtained when or right before the still image data is obtained are closed, obtain still image data a plurality of times; and when still image data is to be obtained, if the eyes of the face included in the image formed from data obtained when or right before the still image data is obtained are not closed, obtain still image data once.

12. The storage medium of claim 11, wherein the instructions, when executed, cause the machine to:

when still image data is obtained once, determine whether the eyes of a face included in an image formed from the obtained still image data are closed; and when the eyes are closed, inform a user that the eyes are closed.

13. The storage medium of claim 11, wherein the instructions, when executed, cause the machine to:

when still image data is obtained once, determine whether the eyes of a face included in an image formed from the obtained still image data are closed; and when the eyes are closed, obtain still image data again from light incident on the image capture device.

14. The storage medium of claim 11, wherein the instructions, when executed, cause the machine to, when still image data is obtained a plurality of numbers of times, store still image data corresponding to an image in which a degree of openness of eyes is determined to be greatest from among images generated from the pieces of the still image data in a second storage medium.

* * * * *